United States Patent [19]

Berghoff

[11] Patent Number: 4,751,267

[45] Date of Patent: Jun. 14, 1988

[54] ACRYLIC POLYESTER HIGH SOLIDS COATINGS

[75] Inventor: Wellington F. Berghoff, Beachwood, Ohio

[73] Assignee: The Glidden Company, Cleveland, Ohio

[21] Appl. No.: 44,717

[22] Filed: May 1, 1987

Related U.S. Application Data

[63] Continuation-in-part of Ser. No. 836,744, Mar. 6, 1986.

[51] Int. Cl.$^4$ .............................................. C08L 63/00
[52] U.S. Cl. .................................... 525/108; 525/111; 525/133; 525/142; 525/143; 525/162; 525/163; 525/488; 525/502; 525/514; 525/518
[58] Field of Search ............. 525/108, 111, 143, 142, 525/133, 162, 163, 903, 488, 502, 514, 518; 524/512, 513

[56] References Cited

U.S. PATENT DOCUMENTS

| | | | |
|---|---|---|---|
| 4,276,212 | 6/1981 | Khanna et al. | 525/162 X |
| 4,338,379 | 7/1982 | Strolle et al. | 428/520 |
| 4,397,989 | 8/1983 | Adesko | 525/162 |

*Primary Examiner*—Theodore E. Pertilla
*Attorney, Agent, or Firm*—Thomas M. Schmitz

[57] ABSTRACT

A high solids coating composition comprises a low molecular weight polymeric blend of acrylic polymer, polyester polymer, and amine cross-linking resin. The acrylic and polyester polymers contain primary hydroxyl groups adapted to coreact and cross-link with active amine cross-linking resin such as aminoplast resins. All of the polymers have a number average molecular weight below about 3000.

21 Claims, No Drawings

ACRYLIC POLYESTER HIGH SOLIDS COATINGS

This is a continuation-in-part application of copending Ser. No. 836,744 filed Mar. 6, 1986, and the same is incorporated herein by reference.

This invention relates to high solids thermosetting protective coatings and particularly to low temperature cure, high solids coatings based on the combination of certain low molecular weight acrylic polymers and certain low molecular weight polyester polymers. The acrylic and polyester polymers are adapted to be heat cured and cross-linked with an amine derivative such as melamine. High solids coatings are non-aqueous coatings containing minor amounts of organic solvents and are particularly useful as coatings on appliances, aluminum extrusions, general metal surfaces, plastic and wood substrates.

Acrylic polymers are known to generally provide useful coatings exhibiting good film properties. These polymers can contain reactive functional groups which are coreactive with other polymers or resins to provide thermosetting binder systems. Such acrylic binders can be produced by solution or bulk polymerization of ethylenically unsaturated monomers including acrylic monomers. Solvent can be added in minor amounts to render the acrylic polymer fluent. Moderately high molecular weight acrylic polymers or polyester polymers have been suggested to provide high solids polymeric compositions such as disclosed in U.S. Pat. No. 4,374,164. Acrylic polymers have been combined with a combination of polyester polyols as suggested in U.S. Pat. No. 4,397,989 or combined with an epoxy polymer as shown in U.S. Pat. No. 4,369,283.

It now has been found that certain low molecular weight acrylic solution polymers having a number average molecular weight below about 2000 combined with certain low molecular weight polyester polymers having a number average molecular weight below about 2000, provide an exceptionally versatile high solids, very low volatile organic solvent (VOC), thermosetting composition coreactive with a compatible fluent amine derivative cross-linking component. The amine derivative preferably is an etherified aminoplast or glycoluril. The acrylic polymer and the polyester polymer are mutually compatible and both contain functional hydroxyl groups which advantageously are adapted to coreact and cross-link with amine derivative to produce a cured paint film comprising an interpenetrating network of cross-linked polyester and acrylic polymer chains. The cured film of this invention exhibits superior all around film integrity properties including extraordinary flexibility and hardness, excellent adhesion, toughness, and impact resistance along with substantially improved salt spray and detergent resistance. The acrylic polymer further includes carboxyl functionality which provides some coreactivity or wetting of pigments such as titanium dioxide to provide an excellent grinding vehicle whereby an acrylic pigment grind composition can be subsequently combind with polyester polymer said aminoplast resin to provide a compatible pigmented composition. Thus, the invention is directed to a non-aqueous pigmentable high solids polymeric composition primarily based on the combination of specific low molecular weight acrylic polymer and a specific low molecular weight polyester polymer. Both the acrylic and polyester polymers are mutually compatible and both polymers contain considerable free hydroxyls adapted to be cross-linked by an aminoplast, phenoplast or glycoluril resin. In particular, the acrylic polymer contains both hydroxyls and carboxyls thereby making the acrylic a highly desirable grinding vehicle for pigments. The carboxyl functional acrylic polymer provides highly desirable coreactivity or wetting of pigments such as titanium dioxide. Incorporating carboxyl functionality into the acrylic polymer unexpectedly imparts excellent pigment dispersion properties and prevents pigment settling. The acrylic pigment grind can be advantageously combined with the similar low molecular weight polyester polymer to provide a stable and compatible pigmented low solids composition. It has been found that the acrylic carboxyl groups stabilize the pigment particles within the acrylic polymer which in turn stabilizes the entire high solids mixture and avoids detrimental settling. These and other advantages of this invention will become more apparent by referring to the detailed description of the invention and the illustrative examples hereinafter.

SUMMARY OF THE INVENTION

Briefly, the invention comprises a non-aqueous high solids polymeric composition based on the combination of low molecular weight acrylic polymer and low molecular weight polyester polymer wherein both polymers contain reactive hydroxyl groups adapted to be coreactive and become cross-linked with an etherified amine derivative coreactive cross-linking component. Preferably, the composition comprises by weight between 1.5% and 40% acrylic polymer, 1.5% and 78.5% polyester polymer, and 10% and 58.5% amine derivative crosslinking resin, wherein the foregoing totals 100%. The composition can be efficiently heat cured at low temperatures in the presence of sulfonic acid curing catalysts.

DETAILED DESCRIPTION OF THE INVENTION

The high solids coating composition of this invention is based on the combination of low molecular weight polymers including acrylic polymer, polyester polymer, and coreactive cross-linking amine resin such as melamine or glycoluril.

Referring first to the acrylic polymer, the acrylic polymer comprises organic solvent solution or bulk copolymerized ethylenically unsaturated monomers, including acrylic monomers, to produce a non-aqueous low molecular weight acrylic polymer containing considerable amounts of reactive primary hydroxyl groups and lesser amounts of carboxyl groups. The molecular weight of the acrylic polymer is below 2000, broadly between 500 and 2000, and preferably between 1000 and 1500 based on number average molecular weights. Molecular weights below 500 cause a curing problem and soft films whereas above 2000 causes viscosity problems. Number average molecular weights are typically measured by GPC according to ASTM methods such as D3016-72; D3536-76; D3593-80; or D3016-78. The acrylic polymers are liquid at room temperature and generally have a Tg between $-20°$ C. and $+20°$ C. as calculated by the Fox equation based on the ratio of specific monomers. The acrylic polymer has a low acid number below about 30, broadly between 5 and 30, and preferably between 12 and 20. The hydroxyl number of the acrylic polymer is high and broadly between 50 and 300 and preferably between 100 and 175. The acrylic polymer can be produced by bulk polymerization of ethylenically unsaturated monomers activated by peroxide or azo or other free radical initiator at polymerization temperatures typically between 70° C. to 170° C. and preferably between 120° C. to 150° C. Typically 0.5 to 2% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred; azo initiators such as azo bisisobutyronitrile and dimethylazobis-isobutyrate; as well as alkali metal persulfate or ammonium persulfates. Mercaptans are ordinarily added to provide copolymers of low molecular weight. Mercaptans useful in controlling molecular weight and primarily to produce low molecular weight polymers include for example 2-mercaptoethanol; 1-mercapto-2-propanol; and 2-hydroxyethyl-3-mercapto propionate. Mercaptans are added at levels around 4% based on monomer solids and broadly between about 2% and 6%. Preferably the monomers containing mercaptans are completely copolymerized before concluding the copolymerization of all monomers to preclude free levels of mercaptans in the polymer. The narrow range molecular weight is very important in this invention to provide compatibility with the polyester and amine derivative cross-linking polymer as well as maintaining sufficiently low viscosity for high solids coatings.

Copolymerizable ethylenically unsaturated monomers useful in producing the acrylic polymer are monomers containing carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefines such as ethylene, propylene, isobutylene, and cyclohex as well as conjugated dienes such as 1,3 butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloracrylic acid, alpha-cycanoacrylic acid, crotonic acid, beta-acryloxy propionic acid, and beta-styryl acrylic acid. Olefinic unsaturated acids include fumaric acid, maleic acid or anhydride, haconic acid, citraconic acid, mesaconic acid, muconic acid, glutaconic acid, aconitic acid, hydrosorbic acid, sorbic acid, alpha-chlrosorbic acid, cinnamic acid, and hydromuconic acid as well as esters of such acids. Ethylenically unsaturated carboxylic acid amides and derivatives can be added in very minor amounts up to 5% and can include acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups.

As noted before, functional monomers are included to provide both carboxyl and hydroxyl groups. Carboxy containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxy alkyl acrylates such as 2-hyroxy ethyl acrylate and methacrylate, 2-hydroxypropyl acrylate and methacrylate, and similar hydroxy alkyl acrylates. Incorporating a minor amount of carboxyl acid functionality in the acrylic polymer was found to provide improved pigment dispersion properties and prevent pigment settling. The Acid No. level of the acrylic polymer is required to provide highly desirable wetting characteristics to wet the pigment when the acrylic polymer is used as a pigment grinding vehicle. The carboxyl groups provide pigment wetting and further maintain a stabilized pigment dispersion within the polymer and avoids undesirable settling. Preferred typical Acid No. can be between about 10 and 20 or moderately higher although high Acid Nos. can cause high viscosity or diminished film properties such as lower salt spray or detergent resistance. On a weight basis, the monomers comprise at least 5% acrylic monomer, between 0.5% and 5% carboxyl monomer, between 10% and 60% hydroxyl monomer, and the remainder being acrylic and/or other ethylenic monomers to provide an acrylic linear copolymer having an Acid No. between 5 and 30 and a hydroxyl No. between 50 and 300.

Referring next to the polyester component of the polymeric mixture, the polyester polymer is a low molecular weight linear polymer having a molecular weight between about 250 and 2000 and preferably between 400 and 1000 based on number average. Linear aliphatic, non-ether type glycols are esterified with considerably lesser molar amounts of aromatic dicarboxylic acid and a linear saturated dicarboxylic acid having between 2 and 10 linear carbon atoms such as adipic, azelaic, succinic, glutaric, pimelic, suberic or sebacic acid to produce low molecular weight polyesters. Preferred and commercially available linear saturated dicarboxylic acids are adipic or azelaic acid. Aromatic dicarboxylic acids (anhydrides) include phthalic, isophthalic, terephthalic, and tetrahydrophthalic. Isophthalic is preferred for superior films exhibiting detergent, salt spray and corrosion resistance. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols. Preferred glycol is neopentyl glycol. The molar excess of the glycol over the lesser molar amounts of aromatic and linear saturated dicarboxylic acid is between about 10% and 80% and preferably between about 20% and 60%. On a molar basis, the preferred low molecular weight polyester polymer comprises between 0.1 and 0.5 moles of aromatic dicarboxylic acid and 0.5 and 0.1 moles of linear saturated dicarboxylic acid per 1 mole of glycol. Hence, the polyester contains considerable excess unreacted hydroxyl groups to provide a hydroxyl polyester having a hydroxyl number between 115 and 285 and preferably between 175 and 240. The polyester contains free carboxyl groups preferably below 15 and typically between 5 and 10. Glycol can be esterified with minor amounts up to about 5% by weight of unsaturated dicarboxylic acids (anhydrides) including maleic, fumaric or itaconic acids; or monocarboxylic acids such as acetic, propyl-, and higher chain aliphatic acids up to about 8 carbon atoms.

The polyester can be produced by solvent or bulk polymerization although bulk polymerization is preferred. The raw materials can be charged in bulk and esterification polymerized at temperatures typically between 190° C. to 240° C. although moderately higher or lower temperatures can be utilized satisfactorily. An esterification catalyst can be used, typically at less than 1% levels based on charge, such as an organo tin compound.

The foregoing hydroxyl functional, low molecular weight acrylic and polyester polymers are further combined with a coreactive amine derivative cross-linking resin such as aminoplast or phenoplast resin. Aminoplast resins are preferred and further include glycolurils. Examples of useful aminoplast resins are the reaction products of ureas and melamines with aldehydes further etherified with an alcohol. Examples of aminoplast resin components are urea, ethylene urea, thiourea, melamine, benzoguanamine. Aldehydes useful in this invention are formaldehyde, acetaldehyde and propionaldehyde, although formaldehyde is clearly preferred. The aminoplast resins can be used in the alkylol form but, most preferably, are utilized in the ether form by etherifying with a monohydric alcohol containing from 1 to about 8 carbon atoms. In a melamine molecule, for instance, up to 3 of the 6 active hydrogens on the amine group can be advantageously substituted with an alkanol group having 1-8 carbon atoms. Higher levels such as 6 substitution can be used as in Cymel 300 which contains 6 substituted methylol groups. The alkanol groups stabilize the melamine or other amine derivative under ordinary temperatures, but enable heat reaction at higher temperatures. Preferred substitutions are between 2 and 4 substitutions to avoid popping or solvent entrapment with a fast curing film. Examples of aminoplast resins are methylol urea, dimethoxymethylol urea, butylated polymeric urea-formaldehyde resins, hexamethoxymethyl melamine, methylated polymeric melamine formaldehyde resin and butylated polymeric melamine formaldehyde resin. Glycoluril derivatives are disclosed in U.S. Pat. No. 4,064,191 and are also known as acetylendiureas. Glycolurils are derived by reacting two moles of urea with one mole of glyoxal to provide a complex ring structure where substitute constituents can be a hydrogen, or a lower alkyl radical, or can be methylolated partially or fully by reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methylated glycoluril tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxmethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxy ethylene urea which is disclosed in U.S. Pat. No. 4,540,735 and incorporated herein by reference. Less preferred amine derivatives are phenolplast resins, or phenolaldehyde resins, which are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make these phenolplast resins are phenol, o, m, or p-cresol, 2,4-xylenol, 3,4-xylenol, 2,5-xylenol, cardanol, p-tert-butylphenol, and the like. Aldehydes useful in this invention are formaldehyde, acetaldehyde and propionaldehyde. Particularly desirable phenolplast resins are polymethylol phenols wherein the phenolic group is etherified with an alkyl, alcohol such as methyl, ethyl, propyl, etc. alcohol.

On a polymer solids weight basis, the blend of polymers comprises broadly between 1.5% and 40% acrylic polymer, between 1.5% and 78.5% polyester polymer, and between 10% and 58.5% amine derivative cross-linking resin. Preferred polymeric blend compositions comprise 15% to 30% acrylic polymer, 20% to 65% polyester polymer and 20% to 50% cross-linker such as aminoplast resin.

In use, the low molecular weight acrylic polymer containing major amounts of primary hydroxyl groups and considerably lesser amounts of unreacted or free carboxyl groups can be used as a grind vehicle for preparing a pigmented vehicle base. The carboxyl functionality on the acrylic polymer advantageously interacts with the normal basic pigment surfaces such as titanium dioxide. Other mineral pigments include carbon black, cadmiums, yellow, brown, and tan iron oxides as well as other oxide pigments and further include inert fillers such as talcs, clays, and fumed silicas. The acrylic polymer physically wets the titanium dioxide pigment surface for instance and further maintains the pigment in stable dispersion. Up to about six weight parts and typically between about 3.5 and 4 weight parts of pigment can be combined with one weight part of acrylic polymer depending on the adsorbtion properties of the pigment particles. Pigmented coatings typically comprise a pigment to binder ratio broadly between 0.5 and 1.5 to 1, and typically a ratio of about 1 to 1. The preformed acrylic polymer pigment grind can be combined with the low molecular weight polyester polymer and the amine derivative cross-linking resin.

Referring now to a further aspect of this invention, low molecular weight reinforcing resins selected from styrene-maleate copolymer, liquid epoxy resin, or a reaction product comprising an alkylene oxide adduct of a Bis-phenol can be added in lesser amounts to the basic polymer blend of acrylic polymer, polyester, and amine cross-linking resin to further provide specifically improved film properties such as detergent resistance, corrosion resistance, salt spray resistance and similar hard to achieve film integrity properties. All of the reinforcing resins have a number average molecular weight below about 3000 and preferably below 2500 to maintain compatability with basic polymeric blend of low molecular weight acrylic and polyester polymers.

The styrene-maleic anhydride copolymers have a molecular weight less than about 3000 and preferably between 1500 and 2500 number average molecular weight. The most preferred sytrene-maleic anhydride copolymers are further reacted with an alcohol to provide a styrene-maleate half-ester. The ratio of styrene to maleic anhydride coreacted can be between 1 to 1 and 3 to 1 molar ratios of styrene to maleic anhydride. Preferably the resulting styrene-maleic anhydride copolymer is further reacted with a lower aliphatic alcohol on approximately a 1 to 1 molar ratio basis of maleic ahydride to aliphatic alcohol to provide a half-ester. Suitable alcohols include for instance methyl, ethyl, propyl, butyl, etc. alcohols. The resulting styrene-maleate half ester copolymers have carboxyl groups which impart adhesion properties as well as a coreactive cite for cross-linking with an aminoplast resin. The Acid No. can be between 100 and 170. On a weight basis, the styrene-maleate copolymer can be added to the basic polymeric blend of this invention broadly between 0 and 20 and preferably between 5 and 15 parts per 100 parts of basic polymer blend.

Referring next to the liquid epoxy reinforcing resin, the molecular weight thereof is below about 3000 and preferably between about 400 and 2500 number average molecular weight. Epoxy resins are polyglycidyl ethers of bisphenol-A synthesized by reacting bisphenol-A with epichlorohydrin where the molecular weight is controlled by controlling the amount of bisphenol-A available to react with available epoxy groups. As the mole ratio of bisphenol-A to epichlorhydrin increases, the average molecular weight of the epoxy resin increases. Low molecular weight liquid epoxy resins are particularly preferred as reinforcing resins in the basic polymeric blend of this invention. On a weight basis, broadly between 0 and 55 parts and preferably between 5 and 10 weight parts of epoxy resin can be added to 100 weight parts of basic polymeric blend.

In a particularly favorable aspect of this invention, the foregoing low molecular weight styrene-maleate copolymer can be combined with the foregoing low molecular weight epoxy resin to provide a highly desirable reinforcing resin in accordance with a preferred aspect of this invention. On a weight basis, about 15 to 40 parts of styrene-maleate copolymer can be combined with about 10 parts of epoxy resin; and the mixture thereof can be added to the basic polymeric blend broadly between 0 and 75 parts, and preferably between 2 and 16 parts, per 100 weight parts of basic polymer blend.

Referring next to the alkylene oxide adduct of a bisphenol compound, this reinforcing compound has a low molecular weight below 1,000 and preferably between about 316 and 708. The alkylene oxide is an aliphatic alkyl derivative having up to about 16 carbon atoms although preferred oxides are lower alkyl oxides such as ethylene, propylene, and butylene oxides. Bis-phenol compounds include bisphenol-A, bisphenol-F and bis-sulfone or sulfides. Typically two or more moles of alkyl oxide are coreacted with one mole of bis-phenol compound. Preferred compositions are 2:1 molar reactions. On a weight basis, between 0 and 55 parts and preferably between 5 and 15 parts of alkylene oxide adduct of a bisphenol compound can be added to 100 parts of the basic polymeric blend.

The merits of this invention based on the basic polymeric blend of low molecular weight acrylic polymer, low molecular weight polyester polymer, and cross-linking amine resin are further illustrated in the following examples.

EXAMPLE SERIES I (Acrylic Polymers)

Low molecular weight acrylic polymers were produced by copolymerizing monomers with 1% by weight dicumyl peroxide catalyst in solvent. The polymers comprise by weight 2.6% methacrylic acid and 20% 2-hydroxyl ethyl acrylate, 40% butyl acrylate, and 37.4% styrene. Based on 100 weight parts of monomer, 25 weight parts of methyl amyl ketone were added. A 2-mercaptoethanol was used at the level of 4% based on monomers to control molecular weight. Polymerization of the monomers was at approximately 145° C. to 150° C. until resulting acrylic polymer had a number average molecular weight of 1200, a weight average molecular weight of 1900.

EXAMPLE II

Similar acrylic polymers were produced as indicated in the following Tables 1-8. Hydroxy numbers were held constant at 122 based on the inclusion of 2-hydroxyl ethyl acrylate monomer. All molecular weights of the acrylic polymers were between 800 and 1200 number averge molecular weight.

TABLE 1

| Resin Number | 779-80 | 1285-2 | 779-81 |
|---|---|---|---|
| Calculated Tg | −27C | −8C | +23.5C |
| Viscosity | Q-R | Y + ½ | Z2 |
| % Non-Volatile | 78.7 | 83.6 | 77.6 |
| Styrene | 15 | 30 | 40 |
| Butyl Acrylate | 65 | 50 | — |
| Ethyl Acrylate | — | — | 40 |
| Solvent | Xylene | Butyl Acrylate | Xylene |

TABLE 2

| Resin Number | 779-79 | 779-78 | 779-85 | 779-97 |
|---|---|---|---|---|
| Calculated Tg | −27C | +5C | −27C | +5C |
| Solvent | Xylene | Xylene | MAK | MAK |
| Viscosity | X + ½ | Z4 + ¾ | V + ½ | Z3 + ½ |
| % Non-Volatile | 78.7 | 79.2 | 79.0 | 80.1 |
| Styrene | 15 | 40 | 15 | 40 |
| Butyl Acrylate | 65 | 40 | 65 | 40 |

TABLE 3

| Resin Number | 779-90 | 1285-1 | 779-100 |
|---|---|---|---|
| Viscosity | U + ¾ | W | V + ¼ |
| % Non Volatile | 79.2 | 81.2 | 81.4 |
| Initiator | Vazo-64 | Dicup R | Dicup R |
| Solvent | MAK | MAK | Butyl Acetate |
| Acid Number | — | 3.2 | 2.0 |

TABLE 4

| Resin Number | 779-97 | 1285-5 | 1569-66 |
|---|---|---|---|
| Viscosity | Z3 + ¼ | Z4 + ¾ | Z2 + ½ |
| % Non Volatile | 80.1 | 81.9 | 76.5 |
| Initiator | Vazo-64 | Dicup R | tBPB |
| Solvent | MAK | MAK | MAK |
| Acid Number | 2.4 | — | 17.6 |

TABLE 5
ACID NUMBER LADDER

| Resin Number | 1285-4 | 1285-20 | 1285-21 | 1285-8 | 1243-35 | 1243-36 |
|---|---|---|---|---|---|---|
| % Methacyclic acid | 0 | 2.3 | 3.1 | 3.8 | 4.6 | 6.1 |
| Acid Number | — | 14.6 | 18.2 | 22.0 | 27.1 | 34.9 |
| Viscosity | Z3 + ¼ | Z4 + ⅔ | Z4 + ¾ | Z4 + ½ | Z7- | Z7-Z8 |
| % Non-volatile | 80.5 | 79.7 | 78.9 | 80.1 | 81.3 | 81.7 |

TABLE 6

| Resin Number | 1285-6 | 1285-16 | 1285-17 | 1285-18 | 1285-23 |
|---|---|---|---|---|---|
| % Methacrylic acid | 0 | 0.8 | 1.5 | 2.3 | 3.8 |
| Acid Number | — | 11.2 | 13.8 | 18.5 | 25.7 |
| Viscosity | V + ¼ | U | U + ½ | V + 4/5 | U + ¾ |
| % Non-volatile | 83.1 | 79.3 | 78.9 | 80.0 | 77.6 |

A molecular weight series of acrylic polymer was prepared by charging levels of chain transfer agent 2-mercaptoethanol.

TABLE 7
MOLECULAR WEIGHT MODIFICATIONS

| Resin Number | 1285-8 | 1243-32 | 1243-33 |
|---|---|---|---|
| % 2-mercaptoethanol | 3.9 | 5.0 | 6.0 |
| Viscosity | Z4 + ¼ | Z5-Z6 | Z2 |
| % Non-volatile | 80.1 | 80.3 | 78.9 |
| Hydroxyl No. | 122 | 130 | 137 |

TABLE 8

| Resin Number | 1569-67 |
|---|---|
| Viscosity | Y + ½ |
| % Non Volatile | 76.5 |
| Acid Number | 7.7 |
| Methyl Amyl Ketone | 25.0 |
| Styrene | 30.0 |
| Butyl Acrylate | 50.0 |
| 2-HEA | 20.0 |
| Dicup R | 3.0 |
| 2-mercaptoethanol | 3.9 |

EXAMPLE III

A low molecular weight hydroxylated polyester was produced as follows:

| | Weight | Moles |
|---|---|---|
| Neopentyl glycol | 56.40 | 0.54 |
| Adipic acid | 26.38 | 0.18 |
| Isophthalic acid | 29.99 | 0.18 |
| 0.1% dibutyl tin oxide | 112.77 | |
| | 12.77 | water esterification loss |
| | 100. | weight parts of polyester polymer |

The glycol was charged first to the reactor and heated to about 125° C. to form a melt. Then the adipic and isophthalic acids were added and the mixture was upheated to about 190° C. to remove water of esterification followed by gradual upheat to about 200° C. to 210° C. and held until the Acid No. was below 10 to produce the polyester polymer. The finished polymer was then reduced with xylene and cooled to produce a fluid polyester resin with the following properties.

| | |
|---|---|
| Acid No. = | 5 |
| Hydroxyl No = | 210 (calculated) |
| % NVM = | 86.9% |
| Color = | 1 |
| Molecular Weight (No. Average) = | 466 (calculated) |

EXAMPLE IV

Similar to Example III, low molecular weight hydroxylated polyesters were produced as follows:

| | Weight |
|---|---|
| (a) Raw Materials | |
| Neopentyl glycol | 55.10 |
| Trimethylol propane | 1.21 |
| Adipic acid | 26.43 |
| Isophthalic acid | 30.05 |
| Resin characteristics | |
| Acid No. | 7.1 |
| Hydroxyl No. | 210 |
| % NVM | 85.8 |
| Solvent | Xylene |
| Molecular weight | 475 |
| (b) Raw Materials | |
| Neopentyl glycol | 56.41 |
| Adipic acid | 26.38 |
| Isophthalic acid | 25.49 |
| Terephthalic acid | 4.49 |
| Resin characteristics | |
| Acid No. | 6.9 |
| Hydroxyl No. | 210 |
| % NVM | 85.4 |
| Solvent | Xylene |
| Molecular weight | 466 |

EXAMPLE V

The acrylic polymer in Example 1 was ground by ball mill grinding with titanium dioxide pigment on approximately a 1 to 4 weight basis of acrylic polymer to pigment as follows.

| Raw Material | Wet Pounds | Dry Pounds |
|---|---|---|
| Acrylic polymer in methyl amyl ketone (example 1) | 17.20 | 12.80 |
| Normal butyl acetate | 62.32 | 0 |
| Titanium dioxide pigment | 478.74 | 478.74 |

This preformed grind was reduced further with additional components including polyester polymer and melamine in accordance with this invention as follows.

| Raw Material | Wet Pounds | Dry Pounds |
|---|---|---|
| Polyester polymer in xylene (Example 3) | 156.86 | 135.69 |
| Xylene | 17.41 | 0 |
| Fumed silica | 7.04 | 7.04 |
| Normal butyl acetate | 75.21 | 0 |
| Melamine in ethanol (Resinamine 797 Monsanto) | 184.50 | 169.74 |

-continued

| Raw Material | Wet Pounds | Dry Pounds |
|---|---|---|
| Normal butyl alcohol | 59.45 | 0 |
| Mixture 1:1 of methane sulfonic and para-tolunene sulfonic in butanol | 16.97 | 8.49 |
| Acrylic surfactant | 2.56 | 1.79 |
| Total | 1210.67 | 921.17 |

PVC = 24.3%
% Pigment = 40.12
% vehicle solids = .47.27
% solids = 76.09
% volatile = 23.91

The foregoing composition provided an excellent low temperature cure coating and was applied as 0.8 mil film to cold rolled steel and cured for 30 minutes at 225° F. Physical properties of the cured paint film were as follows.

| 60° gloss | 96 |
|---|---|
| Impact resistant | 160 pounds direct, 160 pounds reverse |
| Film pencil hardness | 2H |

EXAMPLE VI

In a manner similar to Example V, a high solids coating particularly suitable for an appliance coating was prepared as follows.

| Raw Material | Wet Pounds | Dry Pounds |
|---|---|---|
| Acrylic polymer in methyl amyl ketone (Example 1) | 151.65 | 121.32 |
| Normal butyl acetate | 48.29 | 0 |
| Titanium dioxide pigment | 485.24 | 485.24 |

The foregoing preformed grind was reduced with additional components including polyester polymer and melamine in accordance with this invention as follows.

| Raw Material | Wet Pounds | Dry Pounds |
|---|---|---|
| Polyester polymer in xylene (Example 3) | 166.63 | 144.14 |
| Xylene | 74.63 | 0 |
| Fumed silica | 7.14 | 7.14 |
| Normal butyl acetate | 40.44 | 0 |
| Methyl isobutyl ketone | 14.68 | 0 |
| Styrene-maleate resin | 36.72 | 36.72 |
| Epoxy resin (Epon 828 in xylene) | 15.74 | 14.96 |
| Melamine (Cymel 303; hexamethoxy methyl melamine) | 113.77 | 113.77 |
| Butanol | 35.10 | |
| Dinormal naphthalene sulfonic acid blocked with a secondary amine in normal alcohol | 6.90 | 1.72 |

PVC = 24.5%
% pigment = 40.54
% vehicle solids = 46.87
% solids = 76.31
% volatiles = 23.69

The foregoing composition provided an excellent appliance coating and was applied as 1.2 mil film to cold rolled steel and cured for 20 minutes at 350° F. Physical properties of the cured paint film were as follows:

| 60° gloss (ASTM D-523) | 94 |
|---|---|
| Film pencil hardness (ASTM D-3363) | 4H |
| Impact resistance (ASTM D-2794) | 160 pounds direct 140 pounds reverse |
| Detergent resistance (ASTM D-2248) | 288 hours over primed surface |
| Humidity resistance (ASTM D-2247) | over 1000 hours |
| Salt spray resistance (ASTM B-117) | over 650 hours |

EXAMPLE VII

In a manner similar to Example V, a high solids coating particularly suitable for aluminum extrusions was prepared as follows.

| Raw Material | Wet Pounds | Dry Pounds |
|---|---|---|
| Acrylic polymer in methyl amyl ketone (Example 1) | 136.51 | 109.21 |
| Methyl amyl ketone | 34.60 | 0 |
| Normal butanol | 28.77 | 0 |
| Titanium dioxide | 436.86 | 436.86 |

The foregoing grind was reduced further with additional components including polyester polymer and melamine in accordance with this invention as follows:

| Raw Material | Wet Pounds | Dry Pounds |
|---|---|---|
| Acrylic polymer (Example 1) | 6.75 | 5.40 |
| Polyester polymer in xylene (Example III) | 197.18 | 170.56 |
| Microcrystalline silica | 20.59 | 20.59 |
| Amorphous silica | 20.59 | 20.59 |
| Cymel 303 | 128.53 | 128.53 |
| Cymel 247-10 (butylated melamine in n-butanol) | 17.40 | 10.44 |
| Methanol | 22.47 | 0 |
| Aromatic hydrocarbon | 87.71 | 0 |
| Ethylene glycol diacetate solvent | 6.12 | 0 |
| Butanol | 5.83 | 0 |
| Diisopropanolamine | 1.24 | 0 |
| Di-normal naphthalene sulfonic acid | 1.03 | 0.52 |
| Acrylic surfactant | 0.09 | 0.06 |

PVC = 26.02
% Pigment = 40.08%
% vehicle solids = 47.05%
% solids = 75.69%
% volatiles = 24.315

The foregoing composition provided an excellent aluminum coatingg and was applied as about 1 mil film thickness in an aluminum extrusion substrate and cured at 20 minutes 360° F. Physical properties of the cured film are as follows:

| 60° gloss | 50 |
|---|---|
| Film pencil hardness | 4H |
| Impact resistance | 60+ (aluminum substrate) |
| Detergent resistance | above 24 hours |
| Humidity resistance | above 1000 hours |
| Salt spray resistance | above 1000 hours |

I claim:

1. A non-aqueous, pigmented, thermosetting high solids coating composition comprising on a polymer solids percentage weight basis wherein the total is 100%;

between 1.5% and 40% acrylic grinding vehicle consisting of a low molecular weight acrylic copolymer of copolymerized ethylenically unsaturated monomers comprising a hydroxylated monomer, a monocarboxylic acid monomer, an acrylic monomer, and other ethylenic monomer, said acrylic copolymer having a number average molecular weight between 500 and 2000, a hydroxyl number between 50 and 300, and an Acid No. between 5 and 30, where said acrylic polymer contains pigment ground therein to provide a grind vehicle in the coating composition;

between 1.5% and 78.5% low molecular weight polyester polymer having a number average molecular weight between 250 and 2000, a hydroxyl number between 115 and 285, and an Acid No. less than about 15, said polyester produced by esterifying one mole of a non-ether aliphatic glycol with at least 0.1 mole of an aromatic dicarboxylic acid and at least 0.1 mole of an aliphatic saturated dicarboxylic acid having between 2 and 10 linear carbon atoms, where said glycol is between 10% and 80% molar excess of the moles of said aromatic and moles of said aliphatic dicarboxylic acids; and between 10% and 58.5% of crosslinking resin selected from an aminoplast, a glycoluril, or a phenoplast resin.

2. The high solids coating composition in claim 1 wherein the composition comprises on a polymer solids weight basis between 15% and 30% said acrylic polymer, between 20% and 65% said polyester polymer, and beteen 20% and 50% said amine derivative crosslinking resin.

3. The high solids coating composition in claim 1 wherein said acrylic polymer has a molecular weight between 1000 and 1500.

4. The high solids coating composition in claim 1 wherein said acrylic polymer has a hydroxyl number between 100 and 175.

5. The high solids coating composition in claim 1 wherein said acrylic polymer comprises on a weight basis copolymerized monomers comprising between 0.5% and 5% carboxyl monomer, between 10% and 60% hydroxyl monomer, at least 5% acrylic monomer, and the balance being other ethylenically unsaturated monomer.

6. The high solids coating composition in claim 1 wherein the polyester has a molecular weight between 400 and 1000.

7. The high solids coating composition in claim 1 wherein the polyester has a hydroxyl number between 175 and 240.

8. The high solids coating composition in claim 1 wherein the weight ratio of carboxyl groups to hydroxyl groups is between 1.40 and 1.60.

9. The high solids coating composition in claim 1 wherein the glycol in the polyester polymer is neopentyl glycol.

10. The high solids coating composition in claim 1 wherein the aromatic dicarboxylic acid in the polyester polymer is isophthalic acid.

11. The high solids coating composition in claim 1 wherein the polyester polymer comprises a glycol consisting of neopentyl glycol, an aromatic dicarboxylic acid consisting of isophthalic acid, and an aliphatic dicarboxylic acid.

12. The high solids coating composition in claim 11 wherein the aliphatic dicarboxylic acid is adipic acid.

13. The high solids coating composition in claim 11 wherein the polyester polymer comprises a glycol having a molar excess over the aromatic and aliphatic dicarboxylic acids between 10% and 80%.

14. The high solids coating composition in claim 1 comprising up to 20 weight parts of a styrene-maleate half ester copolymer having a number average molecular weight between 1500 and 2500 combined with 100 weight parts of said high solids coating composition.

15. The high solids coating composition in claim 14 wherein the styrene-maleate half ester copolymer addition is in amounts between 5 and 15 weight parts per 100 weight parts of said high solids coating composition.

16. The high solids coating composition in claim 1 comprising up to 55 weight parts of epoxy resin having a number average molecular weight less than 3000 combined with to 100 weight parts of said high solids coating composition.

17. The high solids coating composition in claim 16 wherein the epoxy resin comprises between 5 and 10 weight parts per 100 weight parts of high solids coating composition.

18. The high solids coating composition in claim 1 including between 2 and 16 weight parts of a resin mixture per 100 weight parts of said high solids composition, wherein said resin mixture comprises 15 to 40 weight parts of a styrene-maleate half ester copolymer having a number average molecular weight between 1500 and 2500 per 10 weight parts of an epoxy resin having a number average molecular weight less than 3000.

19. The high solids coating in claim 1 comprising up to 55 weight parts of an alkylene oxide adduct of a bisphenol having a number average molecular weight less than 1000 combined with 100 weight parts of said high solids coating.

20. The high solids coating in claim 19 wherein the weight ratio of alkylene oxide adduct is between 5 and 15 parts per 100 parts of high solids coating composition.

21. A pigmented, thermosetting high solids coating composition comprising on a polymer solids weight basis:

between 1.5% and 40% low molecular weight acrylic copolymer of copolymerized ethylenically unsaturated monomers comprising a hydroxylated monomer, a monocarboxylic acid monomer, an acrylic monomer, and other ethylenic monomer, said acrylic copolymer having a number average molecular weight between 500 and 2000, a hydroxyl number between 50 and 300, and an Acid No. less than about 30;

between 1.5% and 78.5% low molecular weight polyester polymer having a number average molecular weight between 250 and 2000, a hydroxyl number between 115 and 285, and an Acid No. less than about 15, said polyester produced by esterifying one mole of a non-ether aliphatic glycol with at least 0.1 mole of an aromatic dicarboxylic acid and at lest 0.1 mole of an aliphatic saturated dicarboxylic acid having 1 to 8 carbon atoms where said glycol is at least 20% molar excess of the moles of said aromatic and moles of said aliphatic dicarboxylic acids; and between 10% and 58.5% of an amine derivative cross-linking resin selected from an aminoplast, a glycoluril, or a phenoplast resin; and
said composition containing a reinforcing low molecular weight polymer selected from a styrene-maleate half ester, an epoxy resin, a mixture of styrene-maleate half ester and epoxy resin, or an alkylene oxide adduct of bisphenol.

* * * * *